Figure 1:
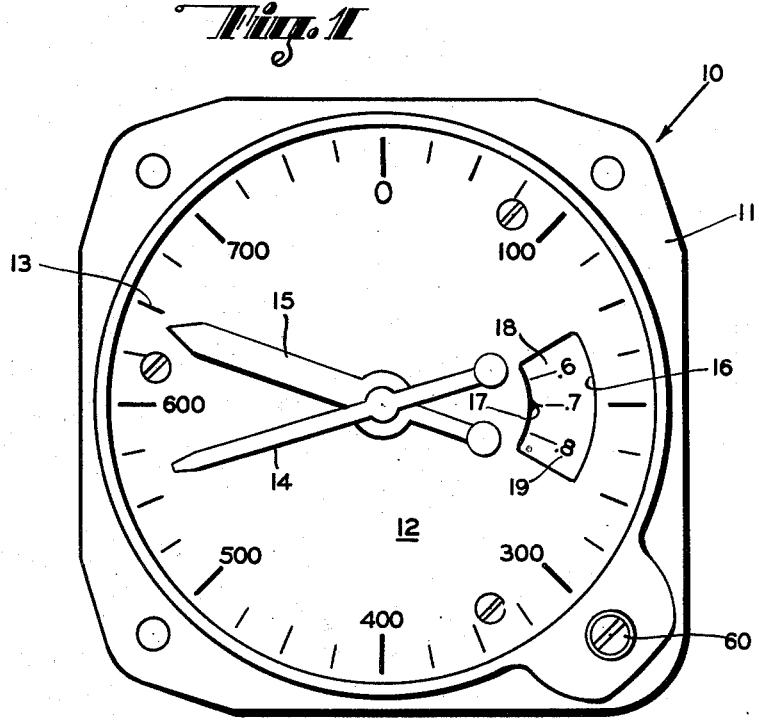

Jan. 9, 1951  R. SHAW, JR  2,537,240

AIR-SPEED INDICATOR

Filed Feb. 1, 1946  2 Sheets-Sheet 1

INVENTOR
RICHARD SHAW JR.
BY *Anton Shille*
ATTORNEY

Jan. 9, 1951   R. SHAW, JR   2,537,240
AIR-SPEED INDICATOR

Filed Feb. 1, 1946   2 Sheets-Sheet 2

INVENTOR
RICHARD SHAW JR.
BY *Anton J. Hille*
ATTORNEY

Patented Jan. 9, 1951

2,537,240

UNITED STATES PATENT OFFICE 2,537,240

AIR SPEED INDICATOR

Richard Shaw, Jr., Bergenfield, N. J., assignor to Bendix Aviation Corporation, Teterboro, N. J., a corporation of Delaware Application February 1, 1946, Serial No. 644,838

7 Claims. (Cl. 73—182)

This invention relates to airspeed indicators, and more particularly to an airspeed indicator provided with a Mach number indicator.

With the advent of turbine and jet engines, and the use of rocket power for propelling aircraft in flight, the speed of air travel today is rapidly approaching that of sound. Heretofore, an aircraft in flight moved through the air at a speed considerably below the speed of sound. The wing, fuselage, tail and rudder surfaces in passing through the air, would create a compression wave in front of the respective surfaces which would part the air to cause the air to flow outwardly and over the approaching surface. The speed of the air flowing outwardly and over the surfaces would be greater than the speed of the aircraft. The flowing air recombined with the greater mass of slower moving air surrounding and behind the aircraft. The turbulence thus created had but a small effect on the performance of the plane.

With increases in the speed of flight, the air flowing over the surfaces of the plane attained the sonic level, although the plane was moving at a speed considerably below the speed of sound. The air now moving at sonic speed in meeting the comparatively slowly moving mass of air surrounding the surfaces, would create shock waves at various points along the plane surfaces. Due to the tremendous increase in drag due to these shock waves and the resultant inefficient, and sometimes ineffectual operation of the tail and rudder surfaces, design considerations had to be given particularly to the wing and tail surfaces to eliminate where possible, the shock waves.

From data obtained in wind tunnel experiments and the design characteristics of a plane, it is now possible to assign a Mach number to a plane of given design. Since a Mach number is the ratio of airspeed to the speed of sound, the safe flying speed for a given aircraft may easily be determined by multiplying the airspeed by the Mach number.

The speed of sound being dependent upon the temperature of the air, and the temperature of the air varying with altitude up to approximately 40,000 feet where the temperature becomes nearly constant, a measure of altitude would approximate the temperature of the surrounding air. Since indicated airspeed is a function of true airspeed and altitude, the maximum safe indicated airspeed may be expressed as a function of altitude and the Mach number.

It is therefore an object of my present invention to provide a Mach ratio indicator operative by the barometric pressure.

Another object of this invention is to provide an airspeed indicator with a Mach indicator to indicate the maximum safe airspeed.

A further object of my invention is to provide an airspeed indicator of the character described with a resetting means whereby the Mach number may be varied in accordance with the aircraft type in which the indicator is installed.

Still another object of this invention is to provide a compact and rugged airspeed indicator of the character described which shall consist of few and simple parts, which shall be relatively inexpensive to manufacture, automatic and positive in its operation; which shall have a large variety of applications and yet be practical and efficient to a high degree in use.

Other objects of my invention will in part be obvious and in part hereinafter indicated.

The invention accordingly consists in the features of construction, combinations of elements and arrangement of parts which will be exemplified in the construction hereinafter described, and of which the scope of application will be indicated in the appended claims.

Figure 2:
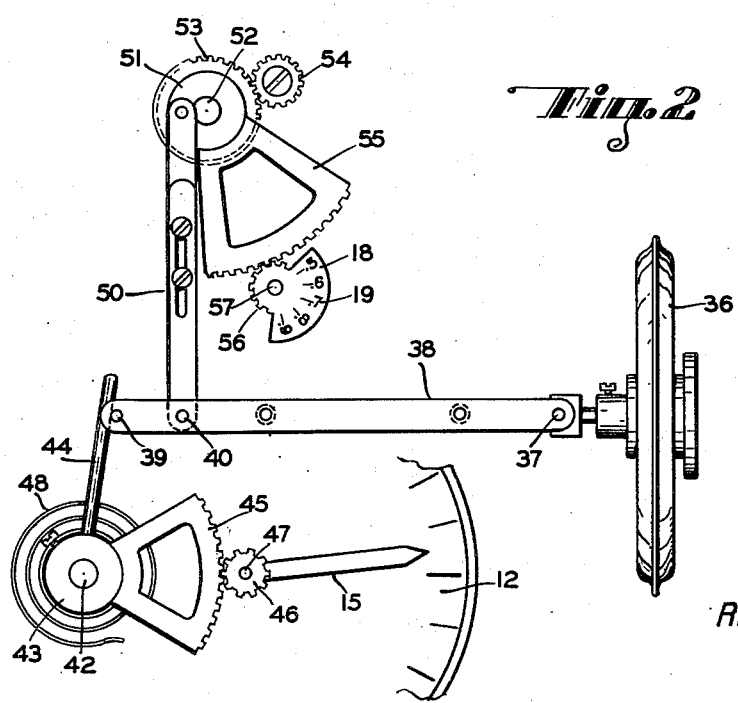
Figure 3:
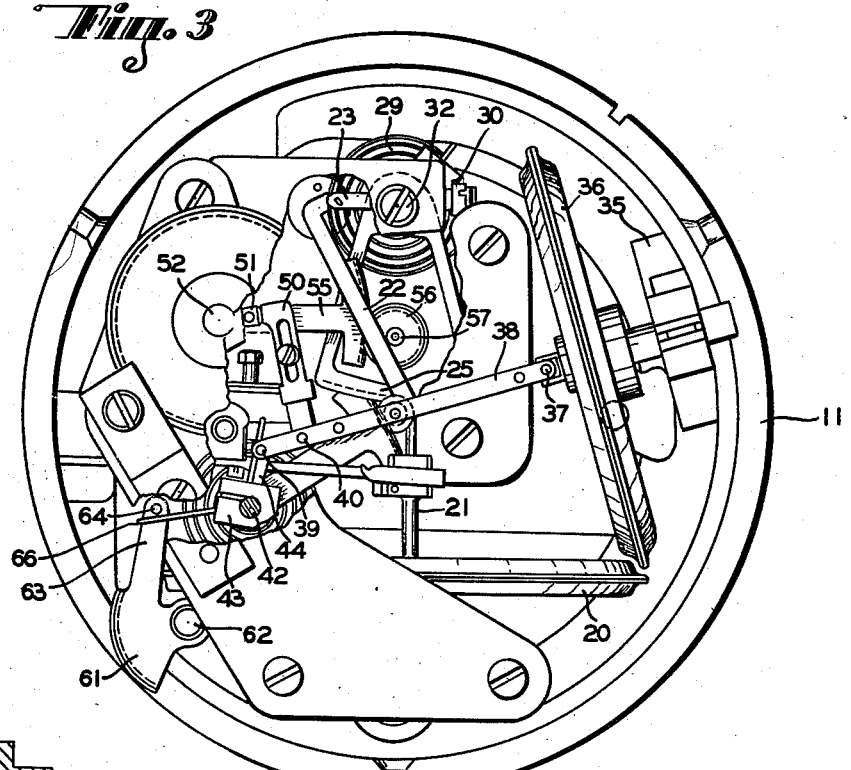
Figure 4:
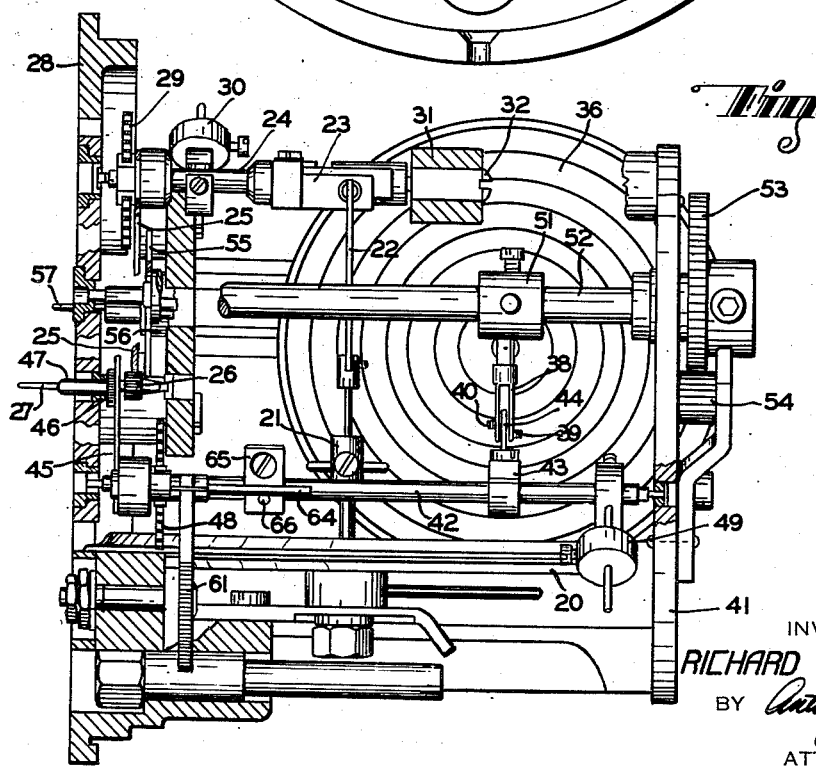

In the accompanying drawings, in which one of the various possible illustrative embodiments of this invention is shown, Figure 1 is an elevational view of an airspeed indicator embodying my invention, Figure 2 is a schematic view of the Mach number indicator mechanism incorporated in the airspeed indicator, Figure 3 is a rear elevational view of the airspeed indicator with portions thereof broken away, while Figure 4 is a side elevational view with portions thereof shown in cross-section.

I accomplish the several objects of my invention by providing a conventional airspeed indicator with two pointers, each of which is rotated by one of two coaxial shafts. Both pointers are read with respect to the same airspeed dial provided for this type of instrument. One of the pointers will indicate the airspeed of the aircraft and is of conventional form and color. The other pointer will indicate the maximum safe airspeed in accordance with the Mach number and is preferably made distinguishable from the airspeed pointer by modifying its form or color. In the embodiment hereinafter set forth, the Mach pointer has been indicated as being much wider than the airspeed pointer, and is preferably colored red.

The airspeed pointer is rotated in the conventional manner by the expansions and contractions of a diaphragm within the instrument which is subjected to the static and dynamic pressure as delivered by a Pitot tube.

The Mach pointer is rotated by the expansion or contraction of an aneroid which is subjected to the atmospheric pressure as delivered to the interior of the instrument casing by the static Pitot line. A lever system and a gear train are used to interconnect the pointer with the aneroid. The ratio of the arms of the lever system may be varied in accordance with the Mach number by means of a resetting screw located within the instrument casing. A small dial bearing Mach numbers is provided in the face of the airspeed dial for resetting the instrument in accordance therewith.

Referring now in detail to the drawings, 10 designates an airspeed indicator embodying the invention encased in a housing 11, and provided with a dial 12 covered by a glass window or other suitable transparent means (not shown). The dial 12 is provided with the dial numerals 13 designating the speed of the aircraft in miles per hour. Cooperating with said dial are two concentric pointers 14 and 15, properly counterweighted; both of said pointers being read with respect to the dial markings 13. Pointer 15, which will hereinafter be referred to as the Mach pointer, is preferably made wider than the pointer 14, the airspeed pointer. The Mach pointer is also preferably colored red, or some other readily distinguishable color different from that of the airspeed pointer.

The dial 12 is provided with an arcuate aperture 16 formed with a small index or reference mark 17. Rotatably mounted behind dial 12 in the manner hereinafter described, is a small arcuate shaped dial 18 bearing Mach ratio number markings 19.

Fixed within casing 11 in a suitable manner is an airspeed diaphragm 20, the interior of which is connected to a dynamic pressure line from a Pitot tube (not shown), while the exterior of which is subjected to the atmospheric pressure delivered to the interior of the casing 11 by a static pressure line from the Pitot tube. Pivoted to the airspeed diaphragm in the usual manner, are links 21 and 22 interconnecting the diaphragm with an arm 23 fixed to a jack shaft 24.

Fixed to the jack shaft 24 is a sector gear 25 meshing with a pinion 26 on a shaft 27 suitably mounted in front wall 28. The airspeed pointer 14 is fixed to the end of shaft 27. A hairspring 29 suitably fixed to the shaft 24 and casing 11 is provided for the return of the pointer 14 to an initial position. A counterweight 30 is also provided on shaft 24 to counterbalance the arm 23 and sector gear 25. The end of shaft 24 supported in a block 31 is provided with a slotted end 32 for elimination of the backlash in the gear train described.

The operation of the airspeed diaphragm and its associated linkage, gear train and pointer will be obvious to those skilled in the art. The airspeed indicated by the pointer 14 will be the indicated airspeed, and not true airspeed.

Means is now provided for rotating the Mach pointer 15.

To this end there is fixed to a boss 35 within the casing 11, an aneroid 36, the exterior of which is subjected to the atmospheric pressure within the casing. Pivoted to said aneroid, as at 37, is a link 38. Integral with said link are two pins 39 and 40, pin 39 being located at the free end thereof, while pin 40 is located close to the free end.

Journaled in the front wall 28 and in the back wall 41, is a horizontal shaft 42. Fixed to said shaft is a collar 43 carrying a pin 44 adapted to abut the pin 39 in link 38. A sector gear 45 is fixed to said shaft near the front wall 28. The sector gear meshes with a pinion 46 fixed to the tubular shaft 47 suitably journaled through the front wall 28, and forming a bearing for the shaft 27. The Mach pointer 15 is fixed to the end of the shaft 47. A hairspring 48 suitably fastened to the shaft 42 and casing 11 will hold pins 44 and 39 in engagement. A counterweight 49 is also provided for the shaft 42.

In operation, the expansion of the aneroid 36 will move link 38 to rotate the shaft 42 by virtue of the abutment of the pins 39 and 44. Shaft 42 will rotate the sector gear 45 to rotate the pinion 46 and shaft 47. The Mach pointer 15 will thus be rotated with respect to the dial 12.

As previously stated, indicated airspeed is a function of true airspeed and the temperature and pressure of the air. Since the temperature of the air is dependent upon altitude, the measurement of altitude (barometric pressure) will approximate the air temperature. A Mach number is the ratio of airspeed to sonic speed. The speed of sound is also a function of the temperature and pressure of the medium through which it is transmitted. It follows therefore, that with indicated airspeed and sonic speed being a function of temperature, the maximum safe airspeed may be expressed as a function of altitude and the Mach number; and both the indicated and maximum safe airspeeds may be read to the same scale. The reading of pointer 15 with respect to dial 12 will thus give the maximum safe airspeed.

Means is now provided to reset the mechanism described in accordance with the Mach number by varying the moment arm of the pin 44, and to provide a visual indication of the Mach number set.

To this end there is provided a link 50, one end of which is pivoted to the pin 40 in link 38, while the other end is pivoted to a collar 51 fixed to a shaft 52 suitably mounted within the casing 11. Fixed to the outer rear end of said shaft is a gear 53 meshing with a pinion 54 rotatably mounted on the rear wall 41. The pinion 54 is suitably slotted as shown in Figure 2 to permit rotation thereof upon the insertion of a screw-driver.

Fixed to the outer end of the shaft 52 is a sector gear 55 meshing with the teeth of a pinion 56 fixed to a jack shaft 57 suitably journaled through the front wall 28 and extending therebeyond (Figure 4). Fixed to the shaft 57 in front of the wall 28 but behind the dial 12 is the Mach ratio dial 18 previously described.

In resetting the mechanism in accordance with a Mach number, pinion 54 is rotated to rotate the gear 53 and the shaft 52. Collar 51 will thus be rotated to raise or lower the link 38 (Figures 2 and 3). By raising the link 38, the radial distance at which the pin 39 abuts the pin 44 will be increased. Thus, for a given expansion of the aneroid 36, the shaft 42 will be rotated through a greater angle than before. By lowering the link 50, the radial distance at which the pin 39 abuts the pin 44 will be decreased thus decreasing the angular movement of the shaft 42 for any given expansion of the aneroid 36.

Rotation of the shaft 52 will also rotate the sector gear 55 to rotate the pinion 56. Shaft 57 will thus be rotated to position the Mach number dial 18 with respect to the index 17.

In operation, therefore, at a given altitude with a given Mach number setting, the pilot in a plane will have before him at all times an indication as to the maximum safe airspeed for the particular type of plane he is flying, together with the indicated airspeed of the plane. Due to the distinguishable form and color of the Mach pointer, the maximum safe airspeed will always be clearly indicated. With the present instrument, the closing of the angle between the Mach pointer and the airspeed pointer will serve as a warning that the airspeed of the plane is rapidly approaching the sonic level.

Means is now provided to limit the maximum safe airspeed as indicated by the Mach pointer.

To this end there is provided a shaft having a slotted end 60 and formed integral with a pinion (not shown), meshing with a sector gear 61 rotatably mounted on a shaft 62. The sector gear 61 is formed with an arm 63 carrying a pin 64. Fixed to the shaft 42 is a collar 65 carrying a pin 66, substantially at right angles with the pin 64 and abutting thereon.

By the insertion of a screw-driver into the slotted end 60, sector gear 61 will be rotated to rotate the shaft 42 due to the abutment of the pins 66 and 64. In this manner a maximum safe airspeed may be indicated which will not be affected by the contraction of the aneroid 36. Thus, at sea level where the speed of sound is approximately 760 miles per hour, a safe maximum speed may be set at a figure considerably less than that value. The expansion of the aneroid due to altitude will rotate the Mach pointer 15 to the safe airspeeds below the airspeed thus set.

It will thus be seen that there is provided a novel airspeed indicator by which the several objects of this invention are achieved, and which is well adapted to meet the conditions of practical use.

As various possible embodiments of the above invention might be made, and as various changes might be made in the embodiment set forth above, it is to be understood that all matter herein set forth, or shown in the accompanying drawings, is to be interpreted as illustrative and not in a limiting sense.

Having thus described my invention, I claim as new and desire to secure by Letters Patent:

1. In an airspeed indicator having a dial and a pointer, and means for rotating the pointer to show airspeed; the combination comprising a pressure responsive member subjected to atmospheric pressure, a link pivoted to said member and movable thereby, a pin in said link, a shaft, a pin in said shaft extending radially therefrom and adapted to abut said first pin for rotating said shaft upon movement of said link, a second pointer coaxial with said first pointer adapted to be rotated with respect to said dial upon rotation of said shaft for indicating the maximum airspeed in comparison with the airspeed indicated by said first pointer, and means for moving said link in a direction transverse to its movement by said member to vary the rotation of said shaft by said link in conformity with the Mach number of the particular aircraft in which the instrument is mounted.

2. In an airspeed indicator having a dial and a pointer, and means for rotating the pointer to show airspeed, the combination comprising a pressure responsive member subjected to atmospheric pressure, a link pivoted to said member and movable thereby, a pin in said link, a shaft, a pin in said shaft extending radially therefrom and adapted to abut said first pin for rotating said shaft upon movement of said link, a second pointer coaxial with said first pointer adapted to be rotated with respect to said dial upon rotation of said shaft for indicating the maximum airspeed in comparison with the airspeed indicated by said first pointer, a second shaft, and means for interconnecting said second shaft with said link for moving said link in a transverse direction to its movement by said member upon angular movement of said second shaft to vary the turning moment applied to said first shaft by said link in conformity with the Mach number of the particular aircraft in which the instrument is mounted.

3. In an airspeed indicator having a dial and a pointer, and means for rotating the pointer to show airspeed, the combination comprising a pressure responsive member subjected to atmospheric pressure, a link pivoted to said member and movable thereby, a pin in said link, a shaft, a pin in said shaft extending radially therefrom and adapted to abut said first pin for rotating said shaft upon movement of said link, a second pointer coaxial with said first pointer adapted to be rotated with respect to said dial upon rotation of said shaft for indicating the maximum airspeed in comparison with the airspeed indicated by said first pointer, a second shaft, means for interconnecting said second shaft with said link for moving said link in a transverse direction to its movement by said member upon angular movement of said second shaft to vary the turning moment applied to said first shaft by said link in conformity with the Mach number of the particular aircraft in which the instrument is mounted, and indicating means associated with said dial actuated by the angular movement of said second shaft for showing the Mach ratio number set into the instrument.

4. In an airspeed indicator having a dial and a pointer, and means for rotating the pointer to show airspeed; the combination comprising a pressure responsive member subjected to atmospheric pressure, a link pivoted to said member and movable thereby, a pin in said link, a shaft, a pin in said shaft extending radially therefrom and adapted to abut said first pin for rotating said shaft upon movement of said link, a second pointer coaxial with said first pointer adapted to be rotated with respect to said dial upon rotation of said shaft for indicating the maximum airspeed in comparison with the airspeed indicated by said first pointer, means for moving said link in a direction transverse to its movement by said member to vary the rotation of said shaft by said link in conformity with the Mach number of the particular aircraft in which the instrument is mounted, and means limiting the rotation of said shaft upon movement of said link by said member to preset a maximum safe airspeed in said indicator.

5. In an airspeed indicator having a dial and a pointer, and means for rotating the pointer to show airspeed; the combination comprising a pressure responsive member subjected to atmospheric pressure, a link pivoted to said member and movable thereby, a pin in said link, a shaft, a pin in said shaft extending radially therefrom and adapted to abut said first pin for rotating said shaft upon movement of said link, a second pointer coaxial with said first pointer adapted to be rotated with respect to said dial upon rotation of said shaft for indicating the maximum airspeed in comparison with the airspeed indicated by said first pointer, means for moving said link in a direction transverse to its movement by said member to vary the rotation of said shaft by said link in conformity with the Mach number of the particular aircraft in which the instrument is mounted, a second pin in said shaft extending radially therefrom, a member adapted to be manually rotated, and a pin in said manually rotatable member adapted to abut said second pin in said shaft to limit the rotation thereof to preset a maximum safe airspeed in the indicator.

6. In an airspeed indicator having a dial and a pointer, and means for rotating the pointer to show airspeed; the combination comprising a pressure responsive member subjected to atmospheric pressure, a link pivoted to said member and movable thereby, a pin in said link, a shaft, a pin in said shaft extending radially therefrom and adapted to abut said first pin for rotating said shaft upon movement of said link, a second pointer coaxial with said first pointer adapted to be rotated with respect to said dial upon rotation of said shaft for indicating the maximum airspeed in comparison with the airspeed indicated by said first pointer, means for moving said link in a direction transverse to its movement by said member to vary the rotation of said shaft by said link in conformity with the Mach number of the particular aircraft in which the instrument is mounted, a second pin in said shaft extending radially therefrom, a member adapted to be manually rotated from the front of the indicator, and a pin in said manually rotatable member adapted to abut said second pin in said shaft to limit the rotation thereof to preset a maximum safe airspeed in the indicator.

7. In an airspeed indicator having a dial and a pointer, and means for rotating the pointer to show airspeed; the combination comprising a pressure responsive member subjected to atmospheric pressure, a shaft, means for rotating said shaft by the movement of said pressure responsive member, a second pointer coaxial with said first pointer adapted to be rotated with respect to said dial upon rotation of said shaft for indicating the maximum safe airspeed in comparison with the airspeed indicated by said first pointer, means for varying the rotating means of said shaft in conformity with the Mach number of the particular aircraft in which the instrument is mounted, and a second means adapted to rotate said shaft independently of said pressure responsive member to preset a maximum safe airspeed in the indicator.

RICHARD SHAW, Jr.

REFERENCES CITED

The following references are of record in the file of this patent:

UNITED STATES PATENTS

| Number | Name | Date |
|---|---|---|
| 1,433,536 | Dugit-Gros | Oct. 31, 1922 |
| 2,217,564 | Scriba | Oct. 8, 1940 |
| 2,258,826 | Torkelson | Oct. 14, 1941 |
| 2,327,394 | Bevins | Aug. 24, 1943 |
| 2,404,746 | Rylsky et al. | July 23, 1946 |
| 2,424,511 | Stanley | July 22, 1947 |

FOREIGN PATENTS

| Number | Country | Date |
|---|---|---|
| 532,638 | France | Nov. 18, 1921 |